Figure 4:
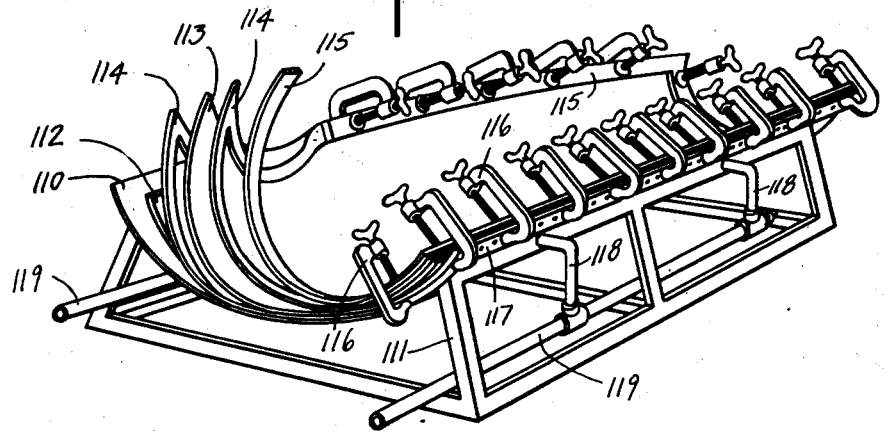

Nov. 14, 1944.　　　　E. C. SLOAN　　　　2,362,672
APPARATUS FOR FORMING MATERIALS
Filed March 22, 1943　　　2 Sheets-Sheet 1
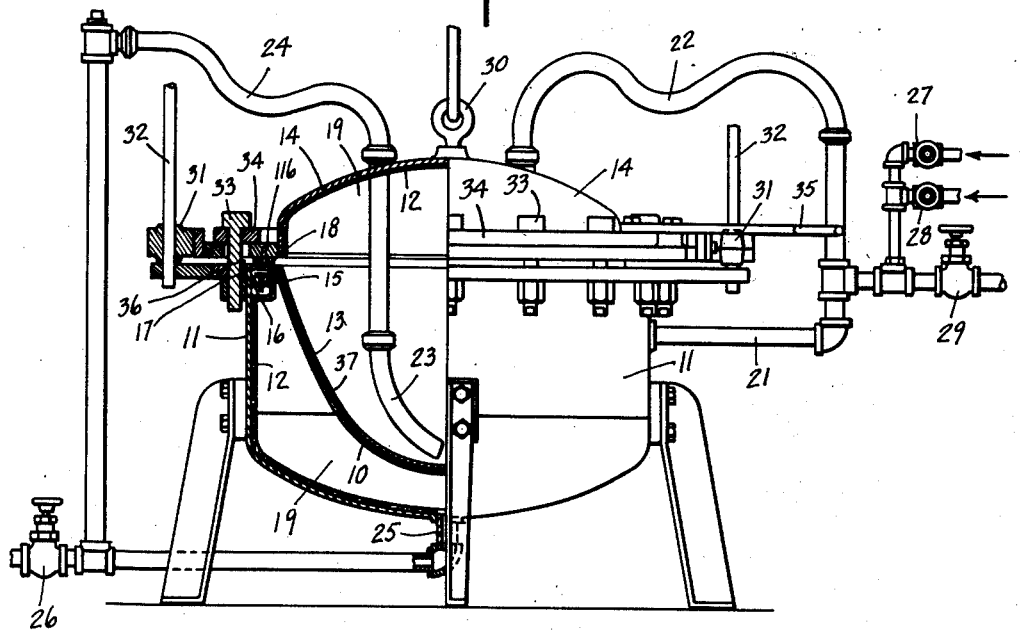
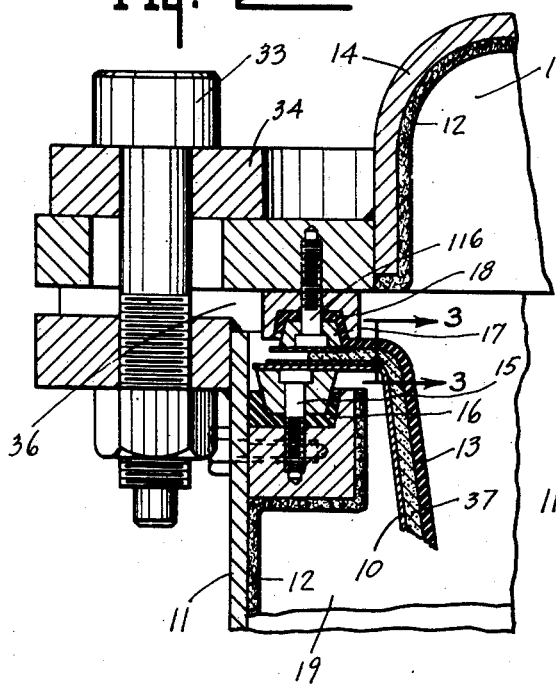
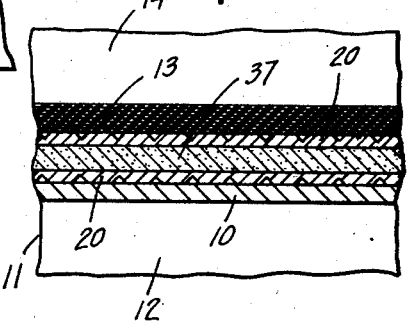
INVENTOR.
EDWARD C. SLOAN.
BY Lockwood, Goldsmith & Galt.
ATTORNEYS.

Nov. 14, 1944. E. C. SLOAN 2,362,672
APPARATUS FOR FORMING MATERIALS
Filed March 22, 1943 2 Sheets-Sheet 2

INVENTOR.
EDWARD C. SLOAN,
BY Lockwood, Goldsmith & Galt,
ATTORNEYS.

Patented Nov. 14, 1944

2,362,672

UNITED STATES PATENT OFFICE 2,362,672

APPARATUS FOR FORMING MATERIALS

Edward C. Sloan, Geneva, Ill., assignor to The Rudolph Wurlitzer Company, Chicago, Ill., a corporation Application March 22, 1943, Serial No. 480,049

1 Claim. (Cl. 18—19)

This invention relates to an improvement in the molding of sheet plastics, paper, wood, cloth and the like, and particularly that type of material which may be molded and formed with the application of heat and pressure. It is particularly applicable to forming sheets of plastic, impregnated paper and cloth laminations, wood veneers and the like which are rendered rigid when compressed in the desired shape or form coupled with a heat transfer treatment.

Heretofore it has been the practice to mount the material upon a forming mandrel, covering it with a flexible or rubber sheet, and applying heat and pressure thereto within a pressure chamber. In this practice the mandrel is generally of solid wood or metal which is expensive to produce, and in combination with the rubber sheet retards heat transfer, resulting in a long period of processing.

Also it has been the practice to first form the material to the desired shape and then compress it between rubber or flexible sheets by surrounding the enveloping sheets with pressure under the application of heat, such as placing the formed material in a rubber bag in a pressure chamber. This requires a preliminary forming and setting of the material before the final heat and pressure is applied, but more particularly the enveloping of the material in a flexible rubber bag or the like causes it to be insulated against efficient heat transfer, thereby requiring a much longer time of treatment than is desirable.

This invention contemplates the final forming and setting of the material through the rapid application of heat transfer and pressure, such as greatly facilitates the introduction of heat to the material or withdrawl of heat therefrom, and consequently reducing the time required for the heat and pressure processing, resulting in the final setting of the material to the desired form.

The invention further contemplates the use of a light sheet metal forming die in place of a solid wood or metal construction of die, such as to enable the metal forming die to be quickly and cheaply fabricated and shaped or reshaped as may be desired.

This is accomplished by employing a thin metal forming die bent or fabricated to the desired shape and having only sufficient rigidity to retain its form during the preliminary shaping of the material to be formed—that is, not sufficient strength to resist final forming pressure. Such metal forming die may be of thin sheet aluminum or other material capable of rapid heat transmission. The material supported by the metal forming die may be then covered by a flexible rubber sheet or the like, and any desired fluid pressure applied simultaneously and equally to the metal die member and the flexible sheet. Thus, the form of the light sheet metal forming die will be effectively maintained by the fluid pressure on one side thereof which is equal to the fluid pressure on the opposite side thereof.

By means of this invention large metal forms or dies of light thin-walled structure may be used in molding materials that require high pressure for good results. The light thin forms are unaffected by the pressure since there is equal and uniform pressure on all surfaces of the die or form. These dies or forms may be readily made by casting, or hammered from sheet metal. The thin-walled metal structure in addition to its ease of production has the further advantage of permitting rapid heat transfer. This results in more rapid production of forming dies and greatly decreased duration of the heat processing, while permitting of any desired compression of the material by the application of fluid pressure thereto.

Figure 5:
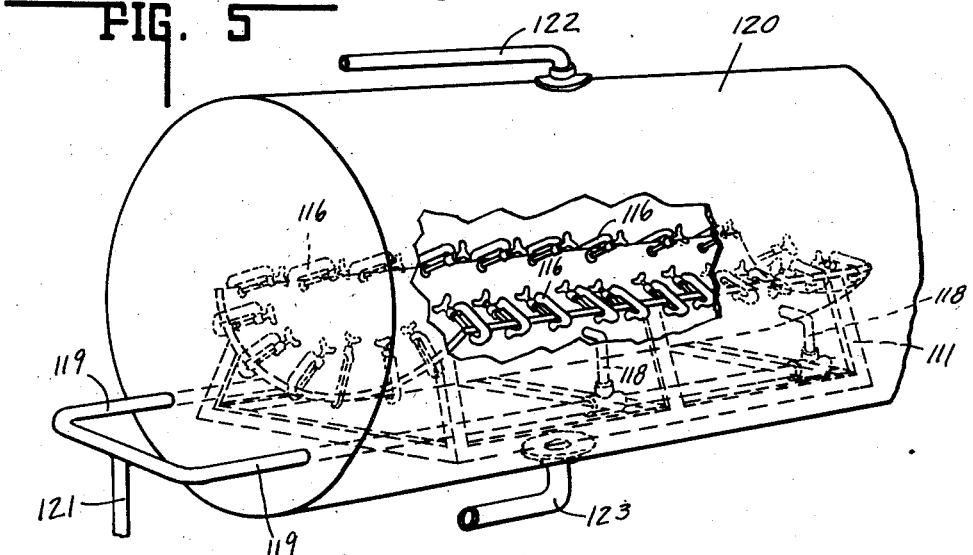
Figure 6:
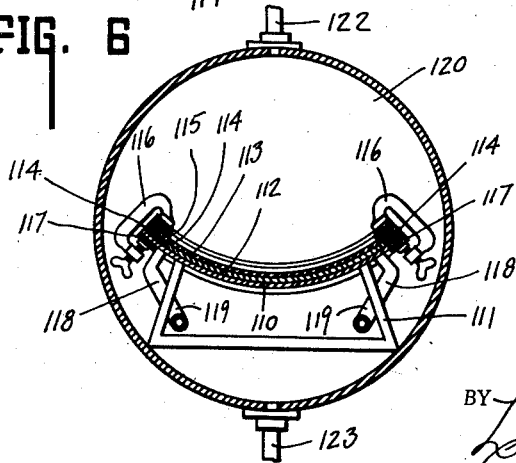

The full nature of the invention will be understood from the accompanying drawings and the following description and claim:

Fig. 1 is a side elevation of the apparatus with one side thereof shown in vertical cross section. Fig. 2 is an enlarged vertical cross section through a portion thereof. Fig. 3 is an enlarged section taken on the line 3—3 of Fig. 2. Fig. 4 is a perspective view showing a modified form of the apparatus for placement in a pressure chamber. Fig. 5 is the same as Fig. 4 showing the apparatus within the pressure chamber. Fig. 6 is a central vertical section reduced in size taken on the line 6—6 of Fig. 5.

For illustration, one form of apparatus for forming materials is shown in Figs. 1, 2 and 3 wherein a metal forming die 10 is mounted in a lower section 11 of a pressure vessel, which vessel may be made of steel plate and provided with a lining of insulating material, indicated at 12. The flexible sheet 13 is secured over an opposing upper section 14 of the pressure vessel, which is similarly insulated. The metal forming die 10 is removably secured to the lower section of the pressure vessel by the screws 15 and provided with a sealing gasket about the peripheral edge thereof, as indicated at 16. The flexible sheet 13 is similarly secured to its section of the pressure vessel by the screws 116 securing the clamping band 17 thereto. The clamping band in turn secures a gasket-like portion of the flexible sheet in sealing relation to the vessel, as indicated at 18.

The space within each of the sections of pressure vessel, closed by the metal forming die and flexible sheet, provides a pair of oppositely disposed pressure chambers 19. Between the marginal portions of the forming die and flexible sheet, there is provided a pair of rings 20 formed with corrugations or exhaust ports (Fig. 3), permitting the exhaust of any air or gases trapped between said die and the flexible sheet.

The lower chamber 19 is connected with a pressure line 21 while the upper chamber is connected with a flexible pressure line 22. The upper chamber is also provided with an exhaust drain pipe 23 projecting downwardly within the chamber to immediately above the flexible sheet when in its forming position. Said drain pipe is connected with an exhaust line 24. An exhaust line 25 is connected with the lowermost portion of the lower pressure chamber 19. Both exhaust lines are connected with an exhaust valve 26 which in turn is connected with a drain line not shown. The pressure lines 21 and 22 are connected with an air input valve 27. Said lines are similarly connected with a water input valve 28 and a steam input valve 29. Said valves 27 and 28 are suitably connected with a supply source and the proper pressure pumps therefor.

The upper section of the pressure vessel is connected by the eye bolt 30 to a hoist (not shown) for raising to separate the flexible sheet from the molded material after the pressure is released and the molding or forming cycle is completed. In the movement upward or downward the upper section of the pressure vessel is held in proper alignment by the guides 31 which slidably engage the guide rods 32. When the material is placed in proper position for molding and the upper section lowered, the locking bolts 33 extend through key shaped slots in the locking ring 34. The ring is then turned by the handle 35 so that the narrow portion of the slots engage the bolt heads, thus making the two sections of the pressure vessel capable of withstanding, without separating, the internal pressure to be applied, and forming a vessel in which equal pressures may be applied to both surfaces of the forming assembly and yet allow air or gas created or trapped between the forming sheets to escape through the grooves of the corrugations 20 and the space indicated at 36.

In operation, the material 37 to be formed which also somewhat conforms to the general shape of the forming die is placed therein while the sections of the pressure vessel are separated. They are then brought together mechanically or in any suitable manner, the upper section of the pressure vessel, as shown herein, being lowered until said sections of the pressure vessel are in adjacent alignment. Held in this position, as described above, the valve 29 is operated to simultaneously discharge fluid into the respective chambers 19 to bring the pressure in said chambers up to the requirements for the processing of the particular material. The pressure being equalized, both above and below the metal forming die, it requires no appreciable strength to maintain its form. The flexible sheet conforms to any irregularities in thickness of the material or structural arrangement thereof and maintains it under the pressure exerted in the chambers in conformity with the forming die. The required heat treatment is rapidly conveyed to or from the material through the thin metal die so that it is rapidly processed or cured under the pressure exerted thereon. Any gases or air trapped or created between the die and sheet escapes through the grooves of the corrugations 20 to the space 36, hence to the atmosphere.

After completion of the treatment, the pressure valve 29 is closed and exhaust valve 26 is opened, whereupon pressure is released from the pressure chambers and any precipitation in the upper chamber is forced therefrom through the flexible drain pipe 23. The upper section of the pressure vessel is then raised, separating the flexible sheet from the metal form to permit removal of the formed and processed material, as indicated at 37.

In Figs. 4, 5 and 6 there is shown a modified form of forming assembly which, for purposes of illustration, may comprise a thin metal forming die 110 which may be hammered or otherwise formed of sheet metal or comprise a thin metal casting, the metal being preferably of high heat conductivity, such as aluminum or the like. It should preferably have some rigidity, as distinguished from a highly flexible, resilient spring metal or highly ductile material, so as to maintain the desired forming shape when receiving the assembled structure, but the die need not be of such inherent strength as to withstand final forming pressure. As illustrated in Fig. 4, it may be conveniently supported upon a cradle 111 for receiving the sheet material to be molded, indicated at 112. Said material may be of a plastic composition, impregnated paper, wood veneer, cloth or laminations thereof, which is subject to being formed through the application of heat and pressure.

The material having been placed upon the metal forming die is then covered by a flexible sheet or membrane 113 which may be of rubber, rubber composition or the like, which is substantially vapor proof and preferably capable of stretching and conforming readily to differences in thickness of the material or any structural formations thereof. In some instances, preforming of the material to be molded may be necessary so that it approximately fits and lies loosely in the thin wall metal forming die.

The material 112 is sealed between the metal forming die 110 and the flexible sheet 113 by providing a gasket 114 therebetween and about the edge of the material. Similarly, a sealing gasket 114 is provided about the exposed edge of the rubber sheet, all of said parts being securely clamped and held together in sealed relation by a marginal band 115 lying over the exposed gasket 114. The clamping and sealing of the above named parts are effected by a series of hand clamps 116 secured about the edges of the assembled parts which directly engage the metal band 115 on one side and a corresponding metal sealing band 117 on the opposite side.

As it is necessary to provide for the elimination of air or gases from between the metal forming die 110 and the flexible sheet 113, said forming die is provided with a series of apertures along its edges in communication with exhaust pipes 118 which in turn communicate with a manifold pipe 119.

The entire assembly, when secured in clamped relation upon the cradle is then placed in a pressure chamber within a tank 120. The manifolds 119 are connected with an outer manifold 121 which in turn may open to the atmosphere or be connected with an exhaust or vacuum pump, not shown. The pressure chamber of the tank 120 is in communication with a pressure line 122 which in turn is connected to a pressure pump (not shown) capable of forcing air, steam or water into the pressure chamber through suitable valve structures, as indicated in Fig. 1. The lower or sump portion of the chamber is connected with an exhaust and drain pipe.

The assembly on the cradle being mounted in the sealed pressure chamber, fluid pressure is developed therein through the pressure line 122, carrying with it the required heat to surround the assembly. Pressure is thereby applied exteriorly of the metal forming die and flexible sheet. Thus, the pressure is equalized on both sides of the metal forming die so that it will not be affected thereby. However, the space occupied by the material to be formed or molded is subjected to high pressure by reason of it being open to the atmosphere or under partial vacuum. This causes the full force of the pressure exerted in the chamber to be applied to the material for both compressing and forming it to the contour of the forming die. The heat units carried into the chamber by the pressure fluid, such as steam, will be rapidly conveyed through the thin metal forming die to the material, so that it will be quickly brought to the desired temperature for the processing or curing. Where desired, a cooling fluid may thereafter be introduced into the pressure chamber to rapidly dissipate the heat to which the material is subjected.

The above arrangement permits not only of a quickly and cheaply provided forming die, but effects a considerable saving in time required for forming and processing the material, due to the rapid heat interchange through the thin metal of the die.

It is to be understood that the invention is applicable to the forming of materials which become set in their formed shape upon the application of heat and pressure, and is equally applicable to that character of material which becomes set to the formed shape upon being cooled or chilled. In either case there is an interchange of heat while the material is subjected to high pressure, in one instance the heat being rapidly transmitted by the hot pressure fluid through the thin forming sheet comprising metal of high conductivity. Conversely, the material to be formed may be placed on the forming sheet while in a heated plastic condition, and thereupon pressure may be applied by a cooling fluid which will rapidly extract the heat from the material through the highly conductive thin metal forming sheet.

The invention claimed is:

Apparatus for forming material involving the application of pressure and heat interchange, including a pair of mating forming dies, one of said dies comprising a preformed thin metal heat transfer sheet with only sufficient rigidity to provide a preliminary support for the material to be formed, a support for said metal sheet spaced therefrom to provide a pressure chamber, the opposite die comprising a sheet of vapor-proof flexible material adapted to conform to said rigid metal sheet, a support for said flexible sheet spaced therefrom to provide a pressure chamber, means for securing said respective die supports together with the material to be formed between said sheets and in direct contact with said heat transfer sheet, a pressure line leading to each support through which heat conveying fluid is conveyed to the respective pressure chambers under pressure, means communicating with each of said chambers for releasing the fluid pressure therefrom, and means intermediate said dies for providing an exhaust port for air or gases entrapped between said sheets, said heat transfer sheet acting to rapidly transfer heat between the material being formed and said fluid, the pressure of the fluid in one chamber acting to neutralize the pressure of the opposite chamber about said forming sheet whereby the pressure exerted on the material to be formed will not effect a distortion thereof.

EDWARD C. SLOAN.